Jan. 10, 1961 J. W. SCHOLTEN 2,967,992

SIGNAL EXPANSION DEVICE

Filed June 14, 1955 2 Sheets-Sheet 1

INVENTOR
JACOB WILLEM SCHOLTEN
BY Fred M. Vogel
AGENT

Jan. 10, 1961 J. W. SCHOLTEN 2,967,992

SIGNAL EXPANSION DEVICE

Filed June 14, 1955 2 Sheets-Sheet 2

INVENTOR.
JACOB WILLEM SCHOLTEN
BY Fred M. Vogel
AGENT

United States Patent Office 2,967,992
Patented Jan. 10, 1961

2,967,992

SIGNAL EXPANSION DEVICE

Jacob Willem Scholten, Hilversum, Netherlands, assignor, by mesne assignments, to North American Philips Company, Inc., New York, N.Y., a corporation of Delaware Filed June 14, 1955, Ser. No. 525,833

Claims priority, application Netherlands June 15, 1954

8 Claims. (Cl. 323—66)

The invention relates to a signal expansion device comprising a dynamic control circuit between its input and output and means for producing an expansion voltage or an expansion current derived therefrom controlling the dynamic control circuit, by comparing the input signals with a reference voltage. Such devices may, for example, be used advantageously to obtain a fixed expansion ratio, for example an expansion ratio of 2, measured in db.

With such devices, which are used inter alia in carrier-wave telephone transmission systems and directional transmitter communications, it is known to obtain the expansion voltage by supplying the input signals through a dynamic control-circuit for compression to a rectifying circuit and by comparing the output voltage thereof with a constant reference voltage. These devices give rise to difficulties in obtaining a similarity for the compression and the expansion in the two dynamic control-circuits.

The invention has for its object to provide a new arrangement of the devices of the aforesaid kind, in which the said difficulties are mitigated or may even be obviated by simple means.

According to the invention the means for producing the expansion voltage comprises a signal rectifier fed by the input signals and a dynamic control-circuit for expanding the reference voltage and an amplitude comparison device controlled by the output voltages of the signal rectifier and the dynamic control-circuit for the reference voltage, an expansion voltage controlling the two dynamic control-circuits being derived from the output of the amplitude comparison device.

A particularly advantageous embodiment has the feature that the dynamic control-circuit for expanding the input signals constitutes at the same time the dynamic control-circuit for the reference voltage, since the input signals and the reference voltage are fed to the input of this dynamic control-circuit, whilst the reference voltage occurring across the output of the said dynamic control-circuit is selected in a reference voltage filter, which is connected to the input of the amplitude comparison device.

In addition to the simplicity, this device has the advantage that in this case the same expansion for the input signals and the reference voltage is ensured.

The invention and its advantages will now be described more fully with reference to the figures.

Figure 1:
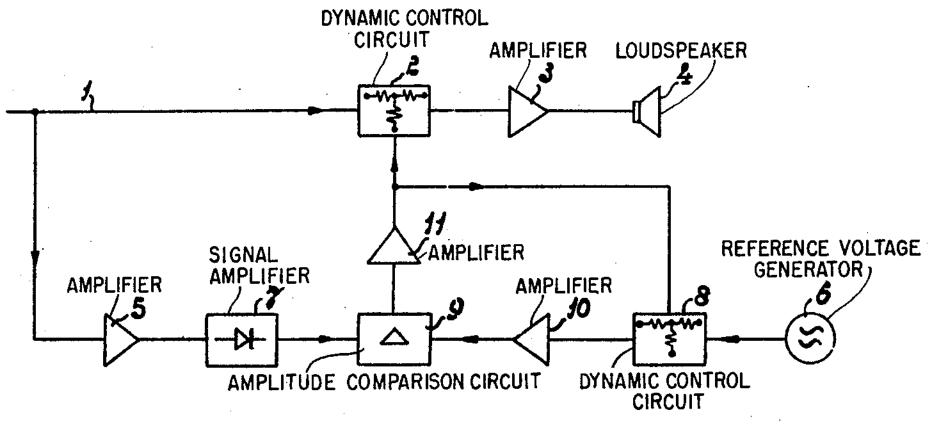
Fig. 1 shows in a block diagram a signal expansion device according to the invention.

The device shown in Fig. 1 for the expansion of signals forms part of a carrier-wave telephone channel and is intended for the expansion of speech signals lying for example in a speech-frequency band of 300 c./s. to 3400 c./s.

In this arrangement the speech signals received through the line 1 are supplied for expansion by a factor 2 to a dynamic control-circuit 2, which is connected through an amplifier 3 to a reproducing device 4. The dynamic control-circuit 2 may be constituted for example by an adjustable damping network, controlled by the expansion voltage.

In order to obtain the expansion voltage for the dynamic control circuit 2, the device shown comprises a signal rectifier 7, which is fed by the input signals through an amplifier 5, and a reference voltage generator 6, which supplies a frequency exceeding the speech-frequency band, for example a frequency of 10 kc./s. In this case the reference voltage is fed through a dynamic control-circuit 8 for the expansion of the reference voltage and through a reference-voltage amplifier 10, to the input terminals of an amplitude comparison device 9, to which also the output voltage of the signal rectifier 7 is fed; from the output of the amplitude comparison device 9 is derived an expansion voltage controlling the two dynamic control-circuits 2 and 8.

In the amplitude comparison device 9 the output voltage of the signal rectifier 7, which varies in accordance with the level variations of the speech signals, this rectifier having a charging time constant of for example 3 msec. and a discharge time constant of for example 30 msec., is compared with the output voltage of the reference-voltage dynamic control-circuit 8, amplified in the amplifier 10, the difference voltage thus obtained subsequent to amplification in an amplifier 11 being supplied as a common expansion voltage to the dynamic control-circuits 2 and 8.

In the expansion device shown a level increase of the speech signals produces a corresponding variation of the expansion voltage in the amplitude comparison device 9, this difference voltage being supplied, subsequent to amplification in an amplifier 11, to the reference-voltage dynamic control-circuit 8. The damping of the reference-voltage dynamic control-circuit 8 is thus reduced, which results in an increase in the amplitude of the expanded reference voltage, whilst conversely a decrease in the level of the speech signals produces a decrease in the amplitude of the expanded reference voltage. The output voltage of the reference-voltage dynamic control-circuit 8, which is included in the loop comprising the amplifier 10, the amplitude comparison device 9 and the amplifier 11, must in this case necessarily follow accurately the level variations of the speech signals. In order to avoid distortions the effective time constant of the loop circuit 8 to 11 is chosen to be smaller than the charging time constant of the signal rectifier 7.

If the damping of the dynamic control-circuit 2 for the speech signals varies with the expansion voltage in the same manner as the damping of the reference voltage dynamic control-circuit 8, level variations of the speech signals, measured in db, are doubled in the dynamic control-circuit 2, and the desired expansion ratio 2 is obtained. Namely, if the level of the input signals varies by a factor $\alpha$, the damping of the reference-voltage dynamic control-circuit 8 will also vary substantially by a factor $\alpha$ and hence also the damping of the dynamic control-circuit 2, so that the output level of the dynamic control-circuit 2 varies by a factor $\alpha^2$, which means an expansion ratio of 2.

Figure 2:
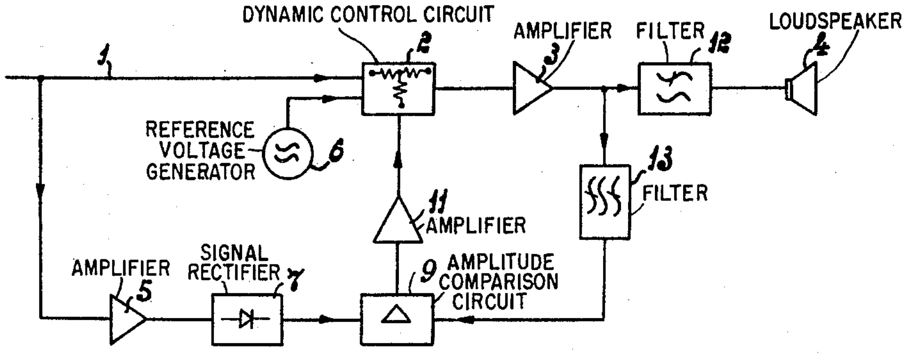
Fig. 2 shows in a block diagram a variant of the device shown in Fig. 1.

Fig. 2 shows a variation of the expansion circuit shown in Fig. 1. Corresponding elements are designated by the same reference numerals.

The use of dynamic control-circuits having similar damping characteristic curves is not required in this arrangement, since the dynamic control-circuit 2 for the speech signals constitutes at the same time the reference-voltage dynamic control-circuit.

In this arrangement the speech signals and the reference voltage from the reference-voltage generator 6 are applied in common to the input of the dynamic control-circuit 2, which is connected to an amplifier 3, the output circuit of which includes selecting filters 12 and 13 for the speech signals and the reference voltage. The speech signals are supplied through a filter 12, suppressing the reference voltage, to the reproducing device 4, whilst the reference voltage is obtained from a reference-voltage filter 13.

The reference voltage of the reference-voltage filter 13 and the output-voltage of the signal rectifier 7 are supplied in common to the amplitude comparison device 9 to produce an expansion voltage, which produces the desired expansion ratio 2 in the manner described fully with reference to Fig. 1.

In this device the dynamic control-circuit 2 and the amplifier 3 serve to expand and amplify the speech signals and also the reference voltage, so that, with respect to the device shown in Fig. 1, one dynamic control-circuit and one amplifier are economized. The filters 12 and 13 for the selection of speech signals and the reference voltage may, in this case, be of very simple construction.

It should be noted here that the expansion circuit shown also permits the attainment of a different expansion ratio; for example, to this end the speech signals occurring at the output of the dynamic control-circuit 2, subsequent to modulation on a carrier wave, may be re-supplied to the input of this dynamic control-circuit.

Figure 3:
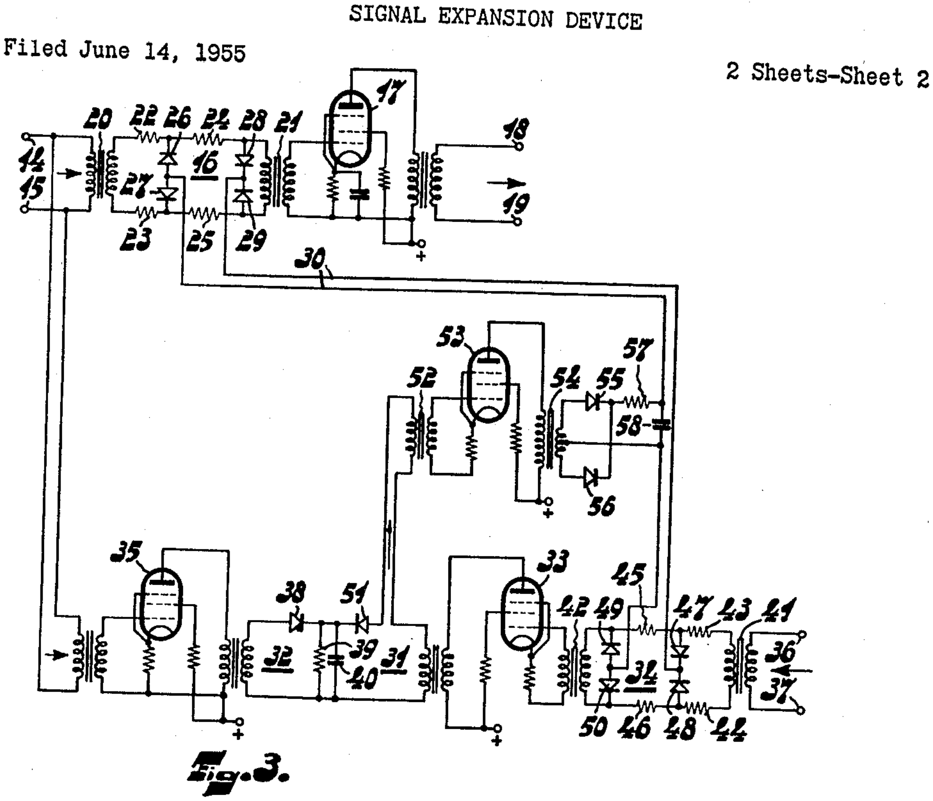
Figs. 3 and 4 show detail diagrams of the device shown in Figs. 1 and 2.
Figure 4:
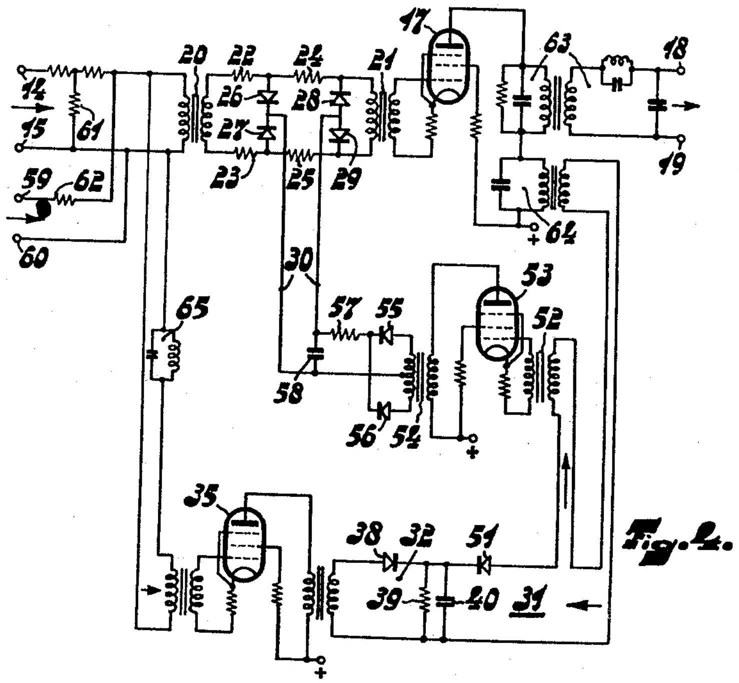

Figs. 3 and 4 show detail diagrams of the expansion circuits shown in the preceding figures.

In the device shown in Fig. 3 the incoming speech signals from the input terminals 14 and 15 are supplied through the cascade connection of a dynamic control-circuit 16 for the expansion of the speech signals and a pentode 17, connected as an amplifier, to the output terminals 18 and 19, which may be connected for example to a reproducing device (not shown). The dynamic control-circuit 16 is provided with an input transformer 20 and an output transformer 21; between the ends of the secondary winding of the input transformer 20 and the primary winding of the output transformer 21 is connected a damping network, which is constituted by the series combination of two potentiometers, formed each by resistors 22, 23 and 24, 25 respectively, and germanium cells 26, 27 and 28, 29 respectively, connected between these resistors; to the junctions of the germanium cells 26, 27 and 28, 29 respectively is connected the expansion voltage lead 30. The germanium cells 26, 27 and 28, 29 operate in this case as variable resistors, which are controlled by the expansion voltage for expansion control.

In order to produce the expansion voltage the device shown is provided with an amplitude comparison device 31, to the input terminals of which is supplied the output voltage of a signal rectifier 32 and also the output voltage of a reference-voltage dynamic control-circuit 34, amplified in an amplifier 33; the devices 32 to 34 are fed from a signal amplifier 35, connected to the input terminals 14, 15 and by a reference voltage from the terminals 36, 37.

The signal rectifier 32 comprises a rectifying cell 38 and an output impedance constituted by a capacitor 40, shunted by a resistor 39, the charging time constant and the discharge time constant of the capacitor 40 being for example 3 and 30 msec., whilst the reference-voltage dynamic control-circuit 34 is constructed in the same manner as the dynamic control-circuit 16 and is provided with an input transformer 41, an output transformer 42, resistors 43, 44, 45, 46 and germanium cells 47, 48, 49 and 50.

In the embodiment shown the amplitude comparison device 31 comprises a rectifying cell 51, cut off by the output voltage of the signal rectifier 32, this cell operating as a threshold device for the reference voltage. The parts of the reference voltage exceeding the output voltage of the signal rectifier 32 are obtained from a transformer 52, connected in series with the rectifying cell 51 and supplied to a push-pull rectifier through an amplifier 53 having an output transformer 54 to produce the expansion voltage, this push-pull rectifier comprising rectifying cells 55 and 56, an output resistor 57 and an output capacitor 58.

The expansion voltage obtained in this manner by amplitude comparison of the output voltage of the signal rectifier with the reference voltage expanded in the dynamic control-circuit 34 across the capacitor 58 produces an expansion of the speech signals by a factor 2, in the dynamic control-circuit 16 as is described above with reference to Fig. 1.

Fig. 4 shows a variation of the device shown in Fig. 3, which differs therefrom in that the dynamic control-circuit 16 produces the expansion both of the speech signals and of the reference voltage. Elements corresponding to those of Fig. 3 are designated by the same reference numerals.

In the arrangement the speech signals and the reference voltage from terminals 59, 60 are supplied through decoupling resistors 61 and 62 to the input of the dynamic control-circuit 16 and amplified in an amplifier 16, connected to the output of the dynamic control-circuit, whilst the speech signals are supplied through a filter 63, cutting off the reference voltage, to the output terminals 18, 19 and the reference voltage is taken from a reference-voltage filter 64 for further treatment.

In order to produce the expansion voltage the reference voltage from the reference-voltage filter 64 is compared in an amplitude comparison device 31 with the output voltage of a signal rectifier 32, which is fed by the input signals from the terminals 14 and 15 through a filter 65, cutting off the reference voltage and through an amplifier 35. In this case the amplitude comparison device 31 is constructed in the same manner as is shown in Fig. 3.

It should be noted that the amplitude comparison device 31 may be constructed, as an alternative, in a different manner. For example, the reference voltage ocurring across the output of the reference-voltage amplifier may be rectified in a rectifier and its output voltage may, in common with the output voltage of the signal rectifier, be supplied to a difference producer, from the output of which the expansion voltage is obtained subsequent to amplification. The amplitude comparison device 31 shown in Figs. 3 and 4 has, however, the advantage that an alternating-current amplifier may be used for the amplification of the difference voltage.

What is claimed is:

1. A signal-expansion arrangement comprising a dynamic signal-controlling circuit having input and output terminals and a control terminal, a source of signals connected to said input terminal, means connected to said output terminal to derive the controlled signals therefrom, an amplitude comparison circuit having two input circuits and an output circuit, a signal rectifier circuit connected between said source of signals and one of said input circuits, a reference voltage generator, dynamic signal-controlling means having an input circuit connected to receive signals from said reference voltage generator, an output circuit connected to the remaining input circuit of said amplitude comparison circuit, and a control terminal, and means connecting the output circuit of said amplitude comparison circuit to both of said control terminals.

2. An arrangement as claimed in claim 1, including means connected to apply the output signal of said rectifier circuit to said amplitude comparison device to provide a threshold voltage for said reference voltage, and further including a rectifier connected to rectify that part of said reference voltage which exceeds the amplitude of said threshold voltage.

3. An arrangement as claimed in claim 1, in which said signal rectifier circuit has a charging time constant of a given value, and in which the circuit loop formed by said dynamic signal-controlling means and said amplitude comparison circuit has a time constant which is smaller than said given value of charging time constant.

4. A signal-expansion arrangement comprising a dynamic signal-controlling circuit having input and output terminals and a control terminal, a source of signals connected to said input terminal, said signals having a given frequency range, a reference voltage generator connected to said input terminal and providing a reference voltage having a frequency outside of said given frequency range, means connected to said output terminal to derive the controlled signals therefrom, an amplitude comparison circuit having two input circuits and an output circuit, a signal rectifier circuit connected between said source of signals and one of said input circuits, means connecting said output circuit to said control terminal, a band-pass filter for passing said reference voltage, and means connecting said band-pass filter between said output terminal and the remaining one of said input circuits.

5. An arrangement as claimed in claim 4, including a filter for passing said given frequency range interposed between said output terminal and said means for deriving the controlled signals therefrom.

6. A signal expansion circuit comprising a source of input signals, a source of reference oscillations, means for producing a control voltage comprising an amplitude comparison circuit having two input circuits and an output circuit, a signal rectifier circuit connected between said source of signals and one of said input circuits, means connected to said output circuit for dynamically controlling signals under control of said control voltage, said dynamic controlling means being connected to said source of signals and source of oscillations to provide dynamically controlled first and second signals corresponding respectively to said input signals and reference oscillations, and means applying said second signals to the other of said input circuits.

7. The circuit of claim 6, in which said input signals have a predetermined frequency range, and the frequency of said reference oscillations is outside of said range.

8. A signal expansion circuit comprising a source of input signals, a source of reference oscillations, first and second means for dynamically controlling signals under the control of a control voltage, said dynamic control means each having an input circuit, an output circuit, and a control circuit, means connecting said source of signals to the input circuit of said first dynamic control means, means connecting said source of reference oscillations to the input circuit of said second dynamic control means, means for producing a control voltage comprising an amplitude comparison circuit having two input circuits and an output circuit, a signal rectifier connected between said source of input signals and one of the input circuits of said comparison circuit, means connecting the output circuit of said second dynamic control means to the other input circuit of said comparison circuit, and means connecting the output circuit of said comparison circuit to the control circuits of said first and second dynamic control circuits.

References Cited in the file of this patent

UNITED STATES PATENTS

| | | |
|---|---|---|
| 2,228,866 | Bjornson | Jan. 14, 1941 |
| 2,576,145 | Rudkin | Nov. 27, 1951 |
| 2,840,777 | De Blasio | June 24, 1958 |